Oct. 3, 1961
N. C. SHANE
3,002,332
GRASS CATCHER AND GUARD FOR LAWN MOWERS
Filed March 19, 1957
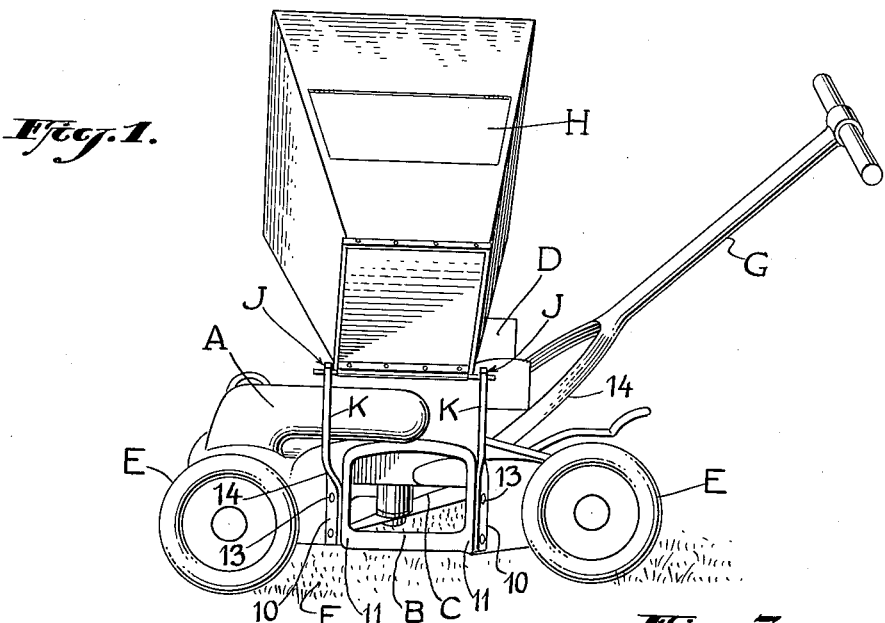
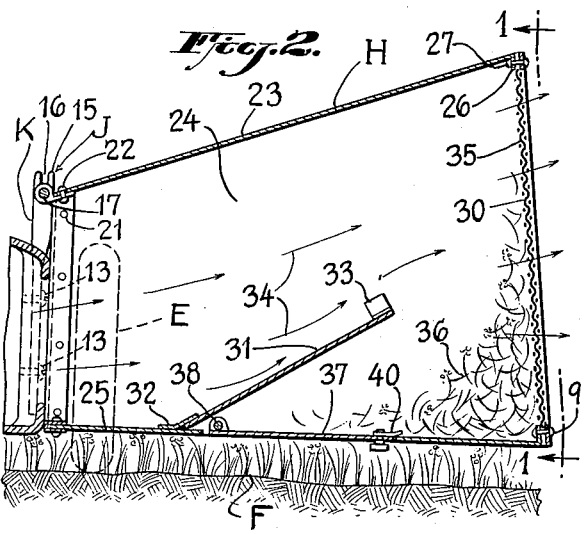
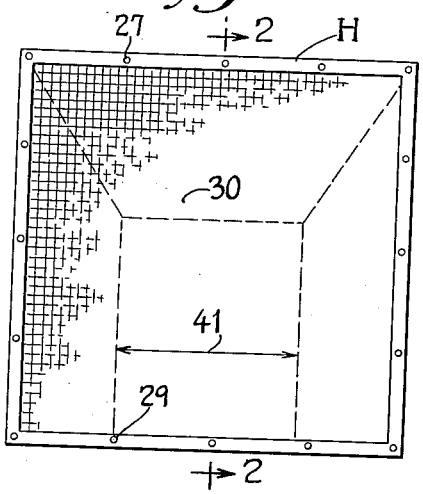
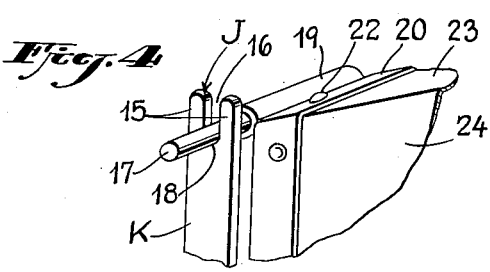
INVENTOR.
NATHANIEL C. SHANE.
BY
ATTORNEY.

United States Patent Office 3,002,332
Patented Oct. 3, 1961

3,002,332
GRASS CATCHER AND GUARD FOR LAWN MOWERS
Nathaniel C. Shane, Valley Road, Oakland, N.J.
Filed Mar. 19, 1957, Ser. No. 647,015
1 Claim. (Cl. 56—203)

The present invention relates to a receptacle and safety guard for mowing machines, and it particularly relates to a safety guard and receptacle to be associated with the rotary type mowing and cutting machines such as used in connection with the maintenance of grass lawns.

Although the present invention has a broad application to all types of mowing or grass cutting machines, it has a particular application to all rotary-type mowers including those that have to be pushed by hand and have no power connection for driving the wheels.

The present invention will be particularly described in connection with its application to rotary blade type mowers, although it also has a specific application to reel type cutters.

It is among the objects of the present invention to provide a simple, durable, readily applied safety guard and receptacle which may be associated with mowers and particularly with rotary type lawn mowers, which will facilitate the collection of the cut vegetation or grass and eliminate the likelihood of stones being thrown or cast across the lawn or across the field in which the mowing operation is taking place.

It is a specific object of the present invention to provide a novel, compact, durable, readily mounted and reliable receptacle and safety guard for lawn mowing machines which will eliminate hand raking or rotary sweeping of the lawn after the cutting or mowing operation, and which will prevent the depositon of a layer of cut grass or cut vegetaton upon the lawn.

At the same time it is a further object that the device will be useful in removing the debris, such as falling leaves or other waste vegetable material from a lawn without raking or sweeping, such as might tend to damage the lawn or injure new vegetation, and to accomplish this with or without the conventional mulching device, attachable to rotary mowers.

The ejection throat on all rotary mowers becomes slightly clogged, particularly when used for mowing while the lawn is damp. Therefore, there is always the temptation to remove grass or other cuttings stuck at the side of the cutting throat while the cutting blades are in motion.

However, with the present invention, the ejection throat is covered while the mower is being operated and thus necessitates stopping in order to remove the receptacle so that the ejection throat is exposed and the blocking material can be safely removed by hand.

A still further object of the present invention is to provide a guard and receptacle of the character above described which may be readily attached or detached, which may be readily emptied, and which will act as a safety device by covering completely the throat of a mower, eliminating the possibility of the ejection throat being accessible while the machine is still operating and which at the same time will readily be applicable to existing machines without additional or expensive reconstruction.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found suitable to provide an outwardly expanding or outwardly divergent frusto-conical or frusto-pyramidal sheet metal or sheet plastic receptacle, which is mounted against the mower.

The end of the receptacle which is mounted against the mower is, in its overall dimensions, larger but the opening into the receptacle is only very slightly larger than the ejection throat opening. The rest of the front end is closed in. This will prevent the cuttings from being thrown out by any backdraft set up in the receptacle.

An important feature of the device of the present invention is that it is simply manufacured and may be readily attached, or disconnected for emptying, and will serve as a guard by completely covering the ejection throat of the mower.

Desirably, the weight of the receptacle is such that it will hold it in position and cause it to swing downwardly and assure that its open mouth portion will closely conform to and be pressed against the opening form of the ejection throat of the mowing machine. The receptacle itself may be formed of thin sheet materials, desirably plastic, although light weight metal may be employed.

Desirably, the receptacle is of molded polyethylene plastic with a separate bar, and it is extremely light and can be handled with one hand, full or empty.

With the foregoing and other objects in view, the invention consists of the novel construction, combination and arrangement of parts as hereinafter more specifically described, and illustrated in the accompanying drawings, whereein is shown an embodiment of the invention, but it is to be understood that changes, variations and modifications can be resorted to which fall within the scope of the claim hereunto appended.

In the drawings wherein like reference characters denote corresponding parts throughout the several views:

FIG. 1 is a side elevational view of a mowing machine with the combined receptacle and guard in up position, as it may be lifted by hand to dump it and also to expose the ejection throat of the mowing machine.

FIG. 2 is a transverse vertical sectional view through the central portion of the receptacle, taken upon the line 2—2 of FIG. 3.

FIG. 3 is an end elevational view of the outlet end of the receptacle taken upon the line 3—3 of FIG. 2.

FIG. 4 is a fragmentary top perspective view of one end of the hinge connection of the receptacle, showing the manner of mounting the receptacle upon the brackets at the side of the mowing machine upon an enlarged scale as compared to FIGS. 1 and 3.

Referring to FIG. 1, there is shown a mower A having an injection throat B with a rotary blade C. The mower is provided with a suitable driving motor D, wheels E to permit it to be rolled over the lawn F, and a handle G.

The present invention is particularly directed to the receptacle H, hingedly mounted at J upon the brackets K.

As shown in FIGS. 1 and 2, the brackets K may consist of two vertical bar members 10 mounted upon the sides 11 of the throat B by means of the bolts 13.

These bar members are twisted at 14 and their upper ends terminate in the clevis members 15.

These clevis members 15 have the vertical slots 16 which receive the ends 17 of the crossbars 18. The crossbars 18 extend through the tubular or sleeve-like member 19, which is mounted upon the inside frame member 20 of the receptacle H.

The pivot portion of the rod 17 above the ejection opening B will hold the receptacle in an angular position so that its weight keeps the receiving opening pressed against the ejection throat of the mower.

The inside frame member 20 consists of an encircling bar or bracket which is connected by means of the rivets or bolts 21 and 22 to the relatively thin, light weight top cover plate 23, side cover plates 24 and bottom enclosure plate 25.

These closure plates 23, 24 and 25, which may be made of fabric, plastic or light sheet metal, extend rearwardly to the rear frame 26, to which they are peripherally mounted by means of the bolts 27 and 29.

Mounted upon the bottom wall 25 is the deflector plate 31 which may extend across the interior of the receptacle H from side to side thereof, being held in position at its lower end by the bracket 32 and at the side walls 24 by the angle members 33.

The bracket 32 and the members 33 are cemented, soldered or welded to the bottom 25 and the sides 24 respectively.

The deflector plate 31 will tend to throw the stones, cut branches or stumps and the other cut vegetation upwardly, as indicated by the arrows 34, where they will hit the top of the screening at 35 and then fall down to form a pile at 36.

This deflection will prevent clogging of the screen 30 and will assure that air will readily pass through the screen and thus not place any undue load or back pressure upon the cutting device. This deflector 31 will also prevent the pile of cuttings 36 from moving back toward the throat B of the mowing machine.

To empty the receptacle H it is only necessary to lift it into the position shown in FIG. 1 and to lift the receptacle H vertically out of the brackets in which the cross bar is set.

The receptacle H, as shown, may have a wide variety of dimensions, and one convenient size has been found to be a length of 16 inches with a dimension of each side of the inlet mouth portion of 9¾ inches and a dimension of each side of the outlet mouth portion at the screen 30 of 16 inches.

This of course will largely depend upon the size of the mouth opening of the mowing machine.

The deflector 31 does not interfere in any way when the receptacle is emptied as described above.

This will more readily permit emptying without the necessity of an extra door, such as indicated at 37 in FIG. 2.

The mesh of the screen 30 may be ¼ inch and it should be such that it will retain cuttings without putting any substantial back pressure upon the machine. The walls 23, 24 and 25 may be of metal, plastic, wood or cloth.

The ejection opening of the mowing machine will normally be of a size ranging from 4¾ inches high to 7 inches in width. Since it will be necessary to stop the movement of the mower if the receptacle H is to be lifted, the danger of trying to clean the ejection throat while the blade is rapidly rotating will be eliminated.

The likelihood of stones being ejected with great force for a substantial distance through the opening B of the mowing machine will be avoided, and the receptacle E will also protect the opening B from accidental insertion of a foot or hand and prevent outside articles becoming wedged in the blades by moving in through the opening B.

When the receptacle H is made of plastic material it may be of approximately the same form and construction as that shown in FIGS. 1, 2 and 3, and instead of using the screen 35 a perforated sheet of plastic material may be employed. It has been found that molded polyethylene material may be satisfactorily employed for making up the receptacle.

It is thus apparent that the applicant has provided a novel receptacle and safety guard for lawn mowers, particularly of the rotable type which is easily put in place and removed without the use of tools, clamps or other devices, and which is readily usable on power rotary motors of all sizes, without limitation in size or design or materials.

As many changes could be made in the above receptacle and safety guard for mowing machines, and many widely different embodiments of this invention could be made without departure from the scope of the claim, it is intended that all matter contained in the above description shall be interpreted as illustrative and not in a limiting sense.

Having now particularly described and ascertained the nature of the invention, and in what manner the same is to be performed, what is claimed is:

A grass catcher or receptacle adapted to be pivotally attached to a lawn mower adjacent the discharge opening thereof, said catcher or receptacle, being substantially frusto-pyramidal in shape, having a bottom plate, side plates and a top cover which together define at one end an inlet opening and at their opposite ends an outlet opening, a foraminous screen secured to said opposite ends and covering said outlet opening, a deflector plate secured to said bottom plate and extending upwardly and away from said inlet opening, said bottom plate having a pivoted mounted door as a part thereof and a horizontal crossbar attached to said top cover adjacent said inlet opening for pivotally attaching said catcher to said mower.

References Cited in the file of this patent
UNITED STATES PATENTS

| | | |
|---|---|---|
| 459,460 | Powell | Sept. 15, 1891 |
| 959,723 | Deck | May 31, 1910 |
| 1,283,325 | Schnake | Oct. 29, 1918 |
| 1,484,084 | Rohrback | Feb. 19, 1924 |
| 1,622,611 | Sera | Mar. 29, 1927 |
| 2,747,356 | Peterson | May 29, 1956 |
| 2,783,604 | Cahill | Mar. 5, 1957 |